July 9, 1974  G. L. SCHULZ ET AL  3,823,055
ULTRASONIC CLEANING AND WELDING APPARATUS
Original Filed July 1, 1970  3 Sheets-Sheet 1
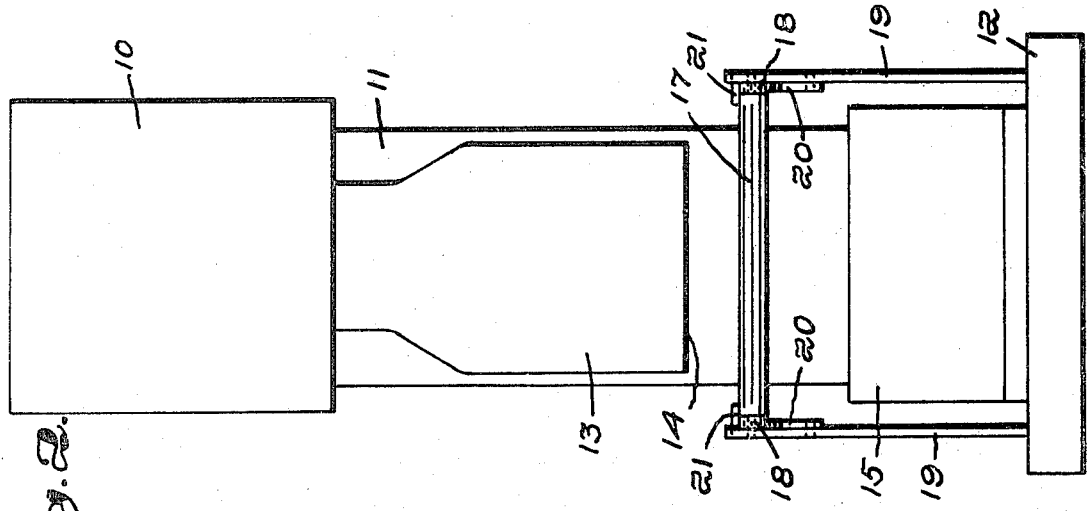
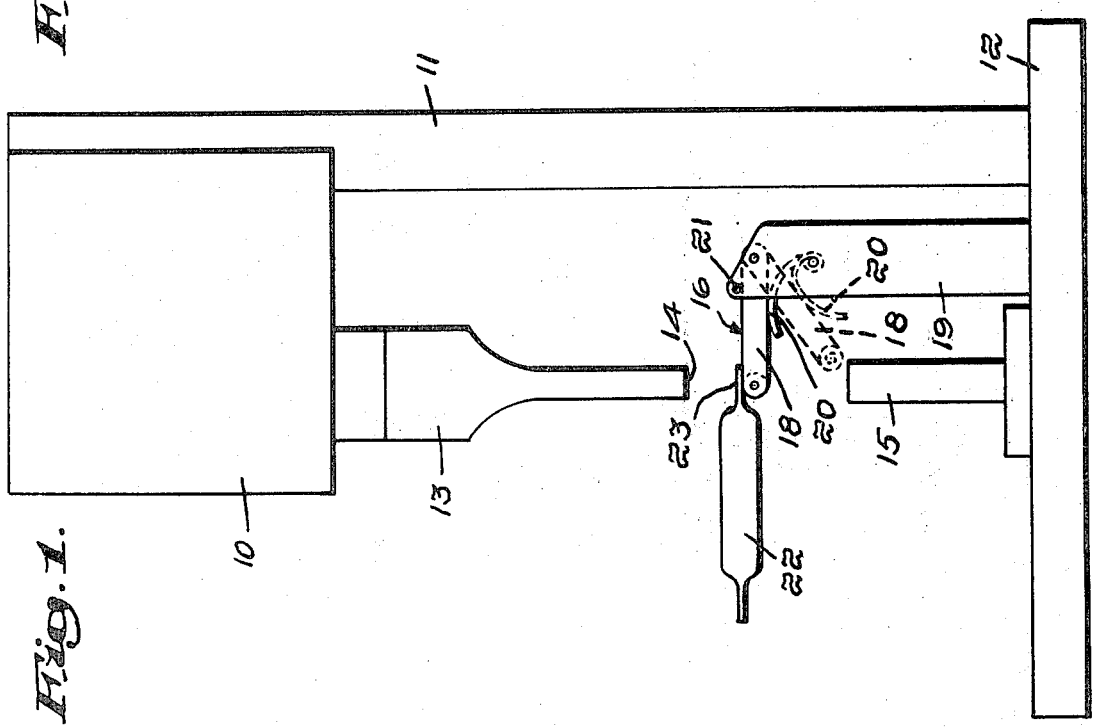

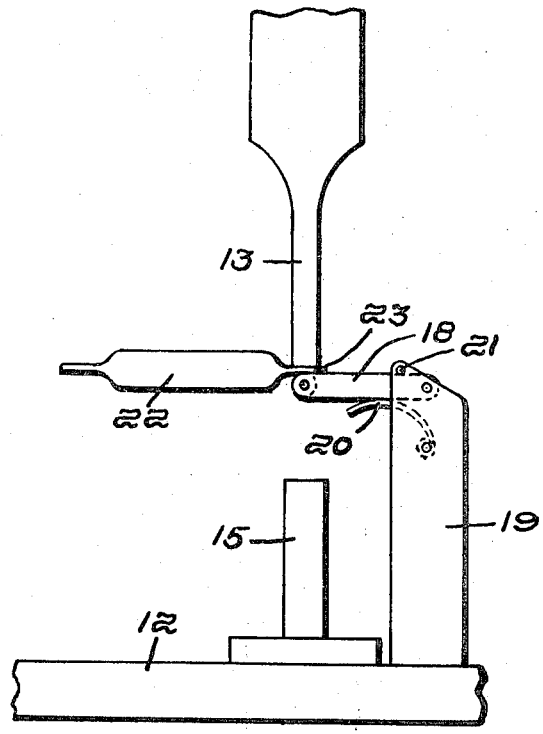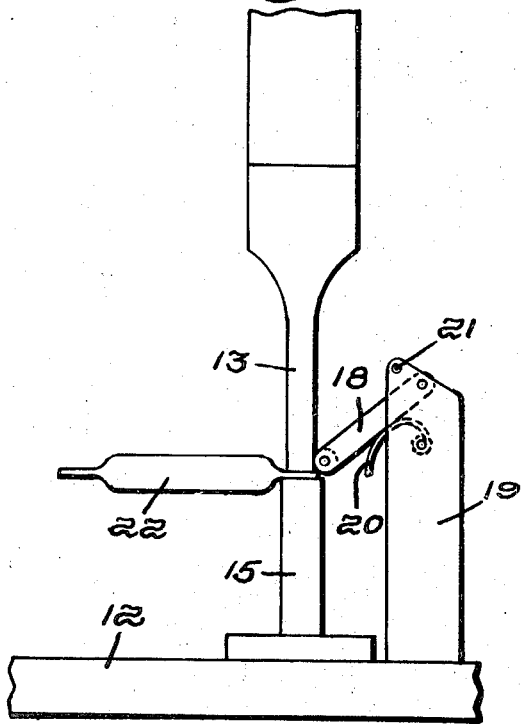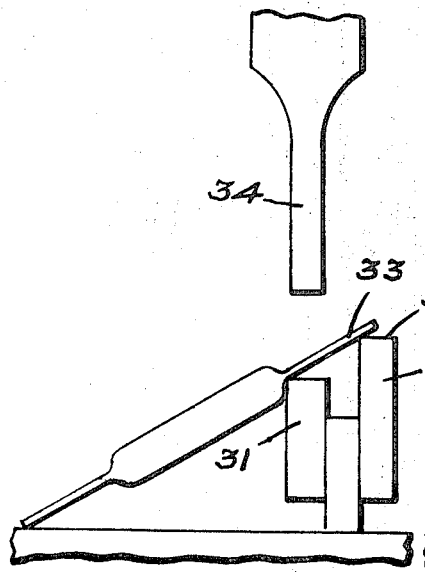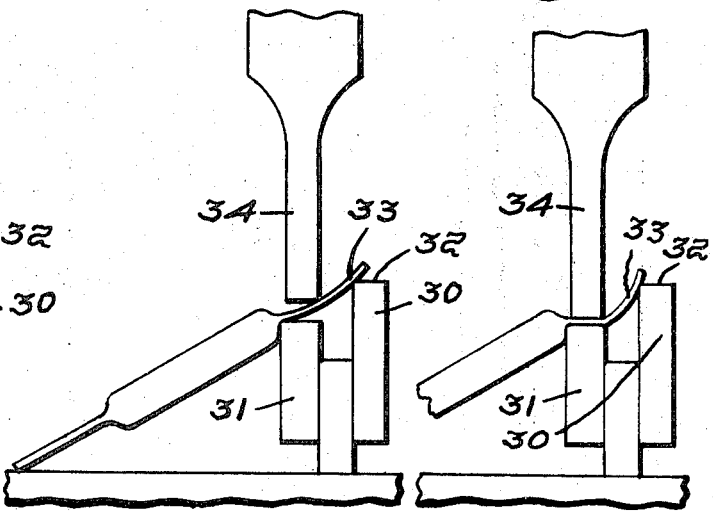

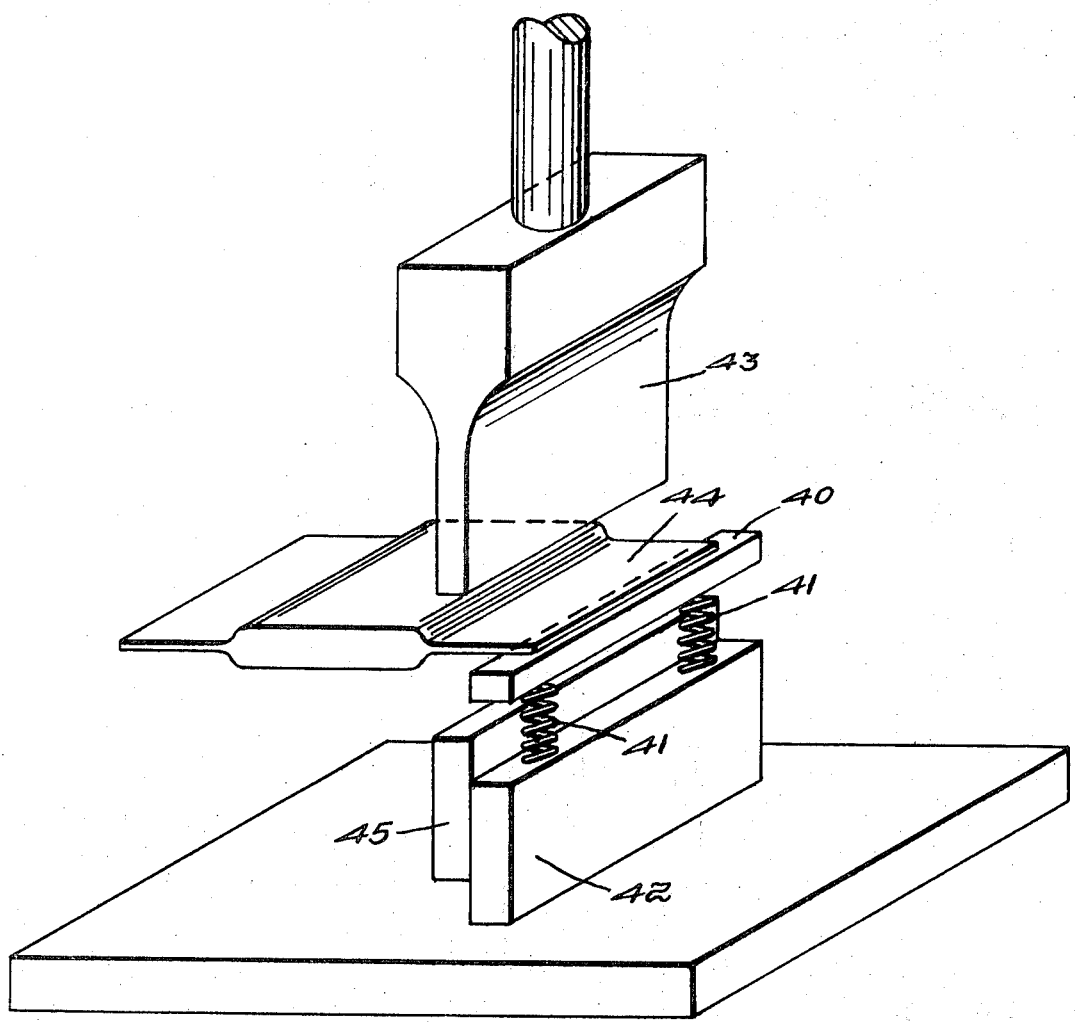

United States Patent Office 3,823,055
Patented July 9, 1974

3,823,055
ULTRASONIC CLEANING AND WELDING
APPARATUS
Gerald L. Schulz, Holliston, and Raymond T. Mansur, Framingham, Mass., assignors to the United States of America as represented by the Secretary of the Army
Continuation of abandoned application Ser. No. 51,462, July 1, 1970. This application July 18, 1972, Ser. No. 272,914
Int. Cl. B23k 1/06; B32b 31/16
U.S. Cl. 156—580                    4 Claims

ABSTRACT OF THE DISCLOSURE

Dry contaminants on seal interface surfaces of flexible packages are removed by causing the interface surfaces to be vibrated by ultrasonic energy for a brief period of time prior to sealing.

---

The invention described herein may be manufactured, used, and licensed by or for the Government for governmental purposes without the payment to us of any royalty thereon.

This is a continuation of application Ser. No. 51,462, filed July 1, 1970, now abandoned.

BACKGROUND OF THE INVENTION

In packaging dry, particulate or dusty components, it has been observed that some of this material frequently contaminates those surfaces of the package which are to be joined together in some fashion to accomplish the final closure. These contaminants are especially significant and troublesome in flexible packages, commonly constructed of individual metal, paper or thermoplastic sheets or foils, or combinations thereof. Sealing is typically accomplished by the application of heat to either activate an adhesive or to weld the surface together. The presence of such contaminants will either prevent formation of the final seal or bond, or will seriously effect the integrity or reliability of such seals. It is apparent, therefore, that it would be highly desirable to have the interface surfaces of such packaging materials free from such contaminants prior to the final seal or bond. This invention is directed toward a method and apparatus useful in removing dry particulate contaminants from the interface surfaces of flexible packaging materials. It has been discovered that the application of ultrasonic energy to such interface surfaces causes the removal of such contaminants. While the use of ultrasonic energy to clean is well known, such cleaning is accomplished by immersing the object to be cleaned in a liquid which is caused to cavitate by ultrasonic vibrations. Cavitation refers to the formation of tiny vapor bubbles which collapse or implode producing tiny shock waves which accomplish the cleaning.

SUMMARY OF THE INVENTION

This invention relates to a method for ultrasonically cleaning dry, particulate contaminants from the surface of flexible packaging materials by transmitting ultrasonic vibrations to the contaminated surfaces to cause the contaminating particles to be removed. This invention also relates to an apparatus for accomplishing the foregoing method wherein ultrasonic energy is employed to first decontaminate the interface surfaces of the packaging material and then to ultrasonically bond or seal the surfaces together.

BRIEF DESCRIPTION OF THE DRAWING

FIG. 1 of the drawing is a view in side elevation of apparatus according to the present invention which ultrasonically decontaminates the interface surfaces of an unsealed package end which surfaces are subsequently bonded by the application of ultrasonic energy.

FIG. 2 is a front elevation of the apparatus of FIG. 1.

FIGS. 3 and 4 are fragmentary side views of the apparatus showing the downward movement of the ultrasonic horn and displacement of the package support means.

FIGS. 5, 6 and 7 show various operating positions of the apparatus of the present invention utilizing a modified form of package support means.

FIG. 8 is another variation of a package support means.

DESCRIPTION OF THE PREFERRED EMBODIMENTS

Ultrasonic energy which is employed in the instant invention is energy in the form of sound waves or mechanical vibrations having a frequency in excess of 15 kHz. or higher and preferably about 20 kHz. Vibrations at these high frequencies cannot normally be perceived by the human ear. Ultrasonic energy is produced by first converting low frequency (60 c.p.s.) electrical energy to high frequency (20,000 c.p.s.) electrical energy. The high frequency electrical energy is then converted to mechanical energy by means of a sonic converter or transducer which vibrates in response to the high frequency electrical input. There are two types of sonic converters, an electrostrictive type, such as piezoelectric quartz or lead titanate zirconate crystals, which undergoes deformation as an electrical charge is applied across its face and a magnetostrictive type, such as nickel metal laminates, which undergo rapid expansion and contraction in response to rapidly changing magnetic fields. In either type, the high frequency electrical energy is changed to mechanical vibrations having the same frequency.

There is shown in FIGS. 1–5 a preferred embodiment of apparatus according to the present invention, which is capable of both removing dry particulate contaminants adhering to the interface surfaces of the open end of a flexible pouch or package and of ultrasonically sealing or bonding the decontaminated interface surfaces together. Referring now to FIGS. 1 and 2, there is illustrated an ultrasonic generator 10, mounted on an upstanding column 11 which is attached to a large flat base 12. The ultrasonic generator contains a power supply which converts 60 cycle/second electrical energy to 20,000 cycle/second electrical energy and a sonic converter which converts the high frequency electrical energy to high frequency mechanical vibrations (ultrasonic energy). The mechanical vibrations are conducted from the sonic converter to the work site by means of an acoustic horn 13 which is a metal section tuned to resonate at the same frequency and having an output end 14 shaped to fit the area of contact desired. In this case, the horn has a catenoidal shape tapering to a thin elongated bar-shaped output end. A pneumatic system (not shown in the drawings) is associated with the ultrasonic generator 10 and the column 11 for moving said generator along the column towards and away from the flat top surface of a rigid metal anvil 15. As thus described, the apparatus is a conventional ultrasonic sealer or welder which quickly welds materials together held under pressure between said horn output end and said anvil. The tightly held materials are caused to vibrate at ultrasonic frequencies and because of the pressure applied intense localized frictional heat is quickly produced which causes the formation of a weld.

Located between said anvil 15 and said horn 13 in FIGS. 1 and 2 is a movable package support means designated generally as 16 which is utilized in the package interface cleaning or decontaminating operation. The package support means consists of a spring biased pivoted bar rod which can support the package under light tension for a brief interval against the horn output end 14. In more detail, a cylindrical rod 17 is rotatably mounted between the ends of parallel pivot arms 18. The opposite ends of the arms 18 are each pivotally mounted on separate upright support bars 19. A flexible wire spring 20 having one end attached to the support bar 19 and the other end slideably engaged to the pivot arm 18 urges the pivot arm up under slight tension (of the order of 1 lb./sq. in. or less) against a stop or detent pin 21 mounted on each of the support bars. When sufficient downward pressure is bought to bear on the cylindrical rod to overcome the upward tension of the spring, the rod travels in a downward arc which eventually carries it away from the path of the horn before the horn output end contacts the anvil.

In operation, a polyethylene pouch 22 having an open unsealed end 23 is positioned with respect to the package support means 16 so that the area of the package across which the final closure seal is to be made lies across the support rod 17 as shown in FIG. 1. The package had previously been filled through the open end and the interior surfaces of the unsealed end have been contaminated with dry particulate matter. The ultrasonic generator is connected to a suitable 60 Hz. power supply and the horn output end 14 caused to vibrate at 20 kHz. The pneumatic system moves the horn toward the anvil 15 and on its downward path, the horn output end comes in contact with the package end on the support rod and transmits the ultrasonic vibrations to the package end. The support rod yields under the pressure of the descending horn and moves in a downward arc shown in FIGS. 1 and 3 which carries it away from the path of the horn before the horn contacts the anvil as shown in FIG. 4. The pressure of the spring loaded package support means against the acoustic horn is sufficient to cause the vibrations to be transmitted to the package material, without generating frictional heat, to dislodge the contaminant particles from the package end. The ultrasonic vibrating horn output end then presses the decontaminated package material against the anvil under a pressure of 10 to 30 lbs./sq. in. for a period of from 0.5 to 5.0 seconds to weld the opposing surfaces of the package together along a line which completes the closure of the package. The vibrations cause rapid localized frictional heating to occur along the area of the package held against the anvil under pressure causing the interface surface of the package to melt sufficiently to cause a weld. The ultrasonic generator is turned off and the pressure maintained for a brief interval to permit the heat to dissipate and the plastic weld to harden. The horn is then returned to its upright position by the pneumatic system to start a new cycle.

Modifications of the package cleaning support means are shown in FIGS. 5–8 and consist of means to hold the contaminated package end for a brief interval of time in contact with the vibrating horn end so that the fibrations may be transmitted to the package prior to the sealing operation to decontaminate the aera to be sealed. In FIGS. 5–7 there is shown a sequence of operating views wherein a support plate 30 is shown associated with an anvil 31. The upper surface 32 of the support plate is higher than the top surface of the anvil. FIG. 5 shows a package having an unsealed end portion 33 placed on the support plate. As the vibrating ultrasonic horn 34 descends and contacts the package end, the vibrations are transmitted to the package seal area decontaminating the same. The resistance offered by the package end to the bending moment of the horn is sufficient to cause the vibrations to be transmitted. The horn, as shown in FIG. 7, ultimately presses the decontaminated area against the anvil welding the area of the package under the horn in the manner described above.

In FIG. 8 there is shown a further modification wherein a package support platform 40 supported by springs 41 on the base 42 is positioned adjacent to anvil 45. The contaminated unsealed package end 44 is placed on the platform 40 and the resistance offered by the springs is sufficient to transmit ultrasonic vibrations to the package end but not sufficient to cause the package end to bend as the horn 43 proceeds downwardly pressing the package end into contact with anvil 45. By the time the horn contacts the anvil, the ultrasonic vibrations have decontaminated the package end and a good seal can be effected.

Although several embodiments and examples of the invention have been described herein, they are intended to be merely illustrative, and various modifications can be made therein without departing from the spirit and scope of the invention as defined in the following claims:

What is claimed is:

1. Apparatus for removing dry, particulate, contaminating particles from a plurality of interface surfaces of flexible, thermoplastic film materials and for subsequently ultrasonically welding said interface surfaces together, comprising in combination
    (a) ultrasonic vibration means having a vibrating tip,
    (b) an anvil spaced apart from said vibrating means and having a substantially flat top surface,
    (c) means to bring said vibrating tip and said anvil into contact with opposed portions of said materials with sufficient pressure to cause said plurality of interface surfaces thereof to be welded together by the ultrasonic generation of frictional heat in said materials and then to separate said tip from said anvil, and
    (d) separate package support means intermediate said ultrasonic vibrating means and said anvil and adapted to support that portion of said materials having said plurality of interface surfaces to be sealed against said vibrating tip before said tip and said materials contact said anvil with sufficient pressure to generate frictional heat in said materials, said package support means being adapted to support said portion against said vibrating tip with sufficient pressure to cause said ultrasonic vibration to be transmitted to said interface surfaces to cause said particles to be dislodged therefrom while not being sufficient to cause frictional heat to be generated in said materials, whereby said particles are removed from said interface surfaces prior to welding same together.

2. Apparatus according to claim 1 wherein said package support means consists of a spring loaded support that swings in an arc away from said path of the vibrating tip before said tip contacts the anvil.

3. Apparatus according to claim 1 wherein said package support means consists of a support platform adjacent said anvil which supports said package end above said anvil.

4. Apparatus according to claim 1 wherein said package support means consists of a spring loaded platform adjacent said anvil that supports said package end under sufficient pressure to transmit said vibrations but which yields as said vibrating tip moves said package end against said anvil without causing said package end to bend.

References Cited
UNITED STATES PATENTS 3,294,616  12/1966  Linsley et al. _____ 156—73
3,505,136   4/1970  Attwood _____ 156—380

DOUGLAS J. DRUMMOND, Primary Examiner

M. G. WITYSHYN, Assistant Examiner

U.S. Cl. X.R.

228—1